United States Patent

[11] 3,582,806

[72] Inventor Claude Le Dily
Villemoisson-Sur-Orge, France
[21] Appl. No. 789,646
[22] Filed Dec. 12, 1968
[45] Patented June 1, 1971
[73] Assignee C.I.T.-Compagnie Industrielle Des Telecommunications
Paris, France
[32] Priority Jan. 18, 1968
[33] France
[31] 136,579

[54] WIDE BAND QUADRIPOL NETWORK

5 Claims, 7 Drawing Figs.

[52] U.S. Cl. 330/69, 330/107, 328/155
[51] Int. Cl. H03f 1/36
[50] Field of Search 328/127, 128, 155; 307/230, 262; 330/107, 109, 21, 31, 30 D, 69

[56] References Cited

OTHER REFERENCES

Handbook of Operational Amplifier Applications , Burr-Brown Research Corp., First Edition, 1963 pp 5, 62, 63

*Primary Examiner*—Roy Lake
*Assistant Examiner*—James B. Mullins
*Attorney*—Craig, Antonelli, Stewart & Hill

ABSTRACT: Quadripole capable of yielding a quadrature in a very wide band, or a phase displacement other than 90° in a fairly wide band, essentially comprising a differential amplifier connected to an RC integrator network mounted in the negative feedback loop, and an RC differentiator network mounted in the input circuit.

WIDE BAND QUADRIPOL NETWORK

The invention relates to a quadripole network for effecting a constant phase shift over a relatively wide frequency range between input and output terminals.

Phase shifters have already been proposed which effect a fairly constant phase shift within a frequency band. These are usually complex circuits unless a certain degree of inaccuracy is to be tolerated.

In some of the proposed solutions, two voltages in quadrature are obtained at two separate outputs from a given source. This solution does not however result in a quadripole network. Another solution involves the use of a local oscillator with fixed frequency, which is shifted by 90°, and two voltages of phase 0° and phase 90° demodulate a variable-frequency signal previously modulated by the local oscillator frequency with zero phase shift. The circuit therefore comprises a local oscillator, a phase shifter operating at a fixed frequency, three modulators and three filters. The end result is a complex circuit which is not a true quadripole network.

In accordance with the present invention a quadripole network comprises a differential amplifier having an output terminal and two input terminals one of which is grounded through a first capacitor and connected through a first resistance to the output terminal, while the second input terminal is connected through a second resistance to ground and through a second capacitor to an alternating current source of relatively low internal impedance.

The invention has the advantage that it can provide an asymmetrical quadripole network effecting a 90° phase shift with very close approximation over a relatively wide frequency band of, for example, several octaves. The network of the invention is also capable of being used to effect a constant phase shift different from 90° over a band of a certain width.

Generally speaking, the invention is most useful when applied to relatively low frequencies, not exceeding for example some tens or hundreds kilohertz.

The invention will now be described in more detail, by way of examples, with reference to the accompanying drawings, in which:

FIGS. 1*a* and 1*b* illustrate component circuits employed in a quadripole network;

Figure 1A:
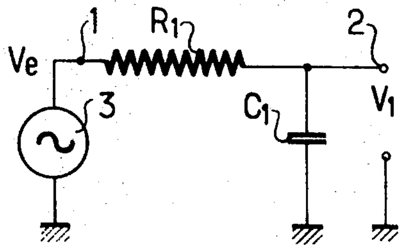

FIG. 1*a* shows a simple integrating circuit formed by a resistance $R_1$ and capacitor $C_1$, connected between an input terminal 1 and an output terminal 2. To the terminal 1 there is connected a generator 3 providing an alternating current source and whose internal impedance is small compared to $R_1$. The generator 3 provides a terminal voltage $V_e$. An output voltage $V_1$ is obtained at the output terminal 2. It is known that the phase shift Φ effected by such an integrator between the signals $V_e$ and $V_1$ is expressed by $\tan\Phi = -R_1C_1\omega$, where ω is 2π times the frequency of the source 3.

Figure 1B:
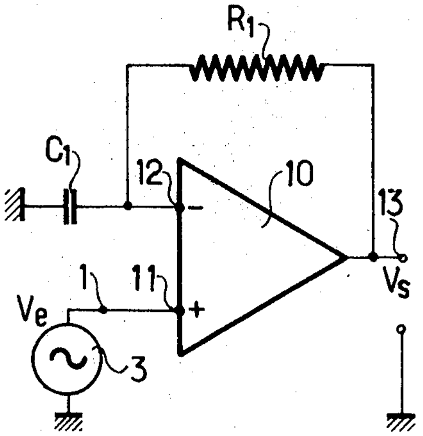

In FIG. 1*b*, the integrating circuit of FIG. 1*a* is inserted into a negative feedback loop of an operational amplifier 10 well known in analogue computing. In open chain, an operational amplifier has a gain sufficiently large, for example of the order of $10^4$, to ensure that in a closed loop its characteristics depend virtually entirely on the negative feedback circuit. Such an amplifier has a differential structure and has two input terminals: a positive terminal 11 (+) for which the phase shift between the voltage $V_s$ on the output terminal 13 and the voltage $V_e$ of the generator on the input terminal 11 is 180°; and a negative input terminal 12 (−) for which the phase shift between the output terminal and the input terminal is zero. Under the conditions shown in FIG. 1*b*, with the generator 3 connected to the terminal 11 and the integrating circuit connected between the output terminal 13 and the input terminal 12, the relationship between the voltages $V_s$ and $V_e$ is given by:

$$\frac{V_s}{V_e}=\frac{R_1-\frac{j}{C_1\omega}}{-\frac{J}{C_1\omega}}=+jR_1C_1\omega+1$$

The phase shift introduced by the circuit $R_1C_1\omega$ is therefore given by:

$$\tan\Phi=+R_1C_1\omega.$$

Figure 2:
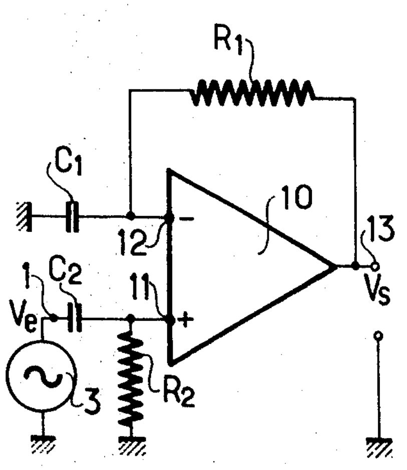
FIG. 2 shows one example of a quadripole network.

In FIG. 2 a differentiating circuit formed of a series capacitor $C_2$ and a branch-connected resistance $R_2$ is connected between the output terminal 1 of the generator 3 and the input terminal 11 of the operational amplifier 10. The diagram is otherwise the same as that of FIG. 1*b*. The internal impedance of the generator 3 is assumed to be negligible compared with the ohmic value of $R_2$.

Under these conditions:

$$\frac{V_s}{V_e}=\frac{R_2}{R_2-\frac{J}{C_2\omega}}\cdot(jR_1C_1\omega+1)$$

or:

$$\frac{V_s}{V_e}=\frac{R_2^2C_2^2\omega^2+jR_2C_2\omega}{R_2^2C_2^{2\omega 2}+1}\cdot(jR_1C_1^{\omega}+1)$$

It is known that in such a product of two complex quantities the phase shifts add up algebraically. We thus have:

$$\Phi=\Phi_1+\Phi_2 \text{ and } \tan\Phi=\tan(\Phi_1+\Phi_2)$$

with $$\tan\Phi_1=+R_1C_1\omega \text{ and } \tan\Phi_2=+\frac{1}{R_2C_2\omega}$$

so that $$\tan\Phi=\frac{\frac{1}{R_2C_2\omega}+R_1C_1\omega}{1-\frac{1}{R_2C_2\omega}\cdot R_1C_1\omega}=\frac{1+R_1C_1R_2C_2\omega^2}{R_1C_1\omega-R_2C_2\omega}$$

For $R_1C_1=R_2C_2$ the denominator is cancelled, so that it is eliminated. We then have $\tan\Phi=\omega$, i.e. $\Phi=90°$ for any value of ω (or of $f=\omega/2\pi$).

The ideal result can of course only be realized in practice in a defined frequency band. There are two reasons for this band limitation:

1. Firstly, the functioning is correct only within the band transmitted by the amplifier 10.
2. In the operating band of the amplifier according to the specifications, a further limitation may arise owing to the fact that the circuit has parasitic reactances caused by parallel capacitances, connection inductances and so forth. This is why the principal applications concern the low frequency range, not exceeding some hundreds kHz. where these limitations exert little influence.

Figure 3:
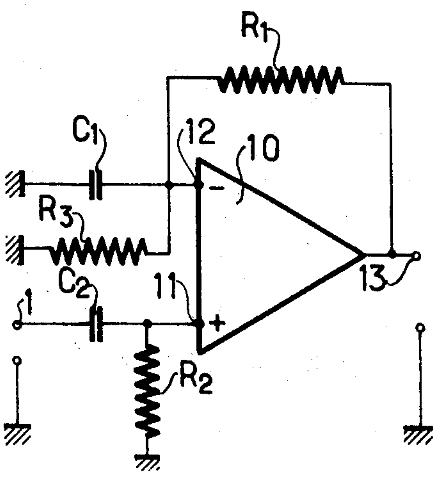
FIG. 3 shows a modified quadripole network.

In FIG. 3, where the same references designate the same circuit components as in FIG. 2, a stabilizing resistance $R_3$ shunts capacitor $C_1$, the value of the resistance $R_3$ being preferably substantially equal to $R_1R_2/R_1-R$.

Figure 4:
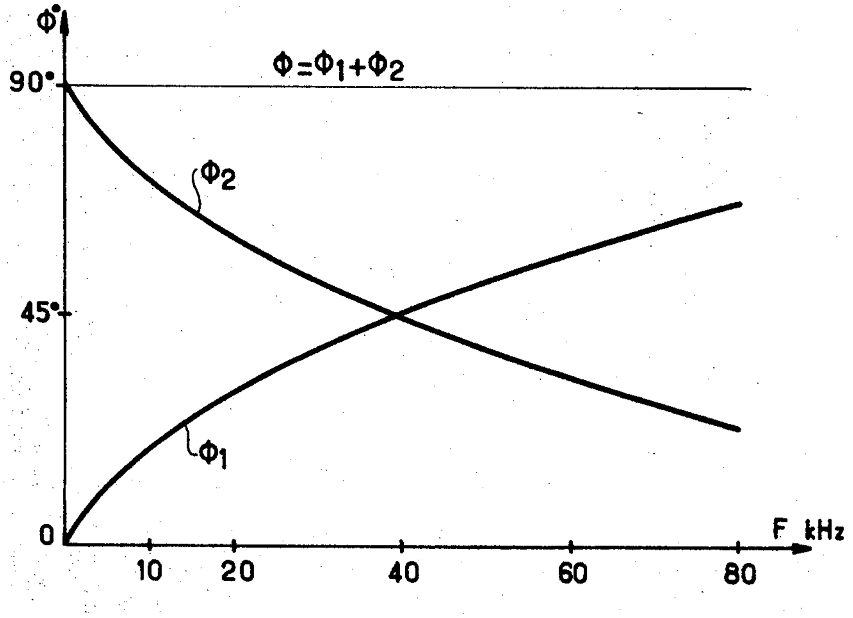
FIG. 4 is a graph, showing the operation of the quadripole network providing a quadrature relationship between input and output; and, FIGS. 5*a* and 5*b* are graphs, showing the results in the case of phase shifts different from 90°.

FIG. 4 is a graph, showing the values of the variables $\Phi=\arctan R_1C_1\omega$ and $\Phi_2=\arctan 1/R_2C_2\omega$, as function of the source frequency $f=\omega/2\pi$, the values of the parameters being such $R_1C\omega=RC_2\omega=1$ for $f=40$ kHz., i.e. $R_1C_1=R_2C_2$. At this frequency of 40 kHz., $\Phi_1=\Phi_2=45°$.

The values of the parameters in this case in one example are such that:

$R_1R_3/R_1+R_3$ayx10.7 k Ω  $C_1=330$ pf.
$R_2=10.7$ kΩ  $C_2=330$ pf.

The quadripole network may be employed to obtain phase shifts different from 90° within a band of a certain width. In this case, $R_1C_1\neq R_2C_2$.

Figures 5A, 5B:
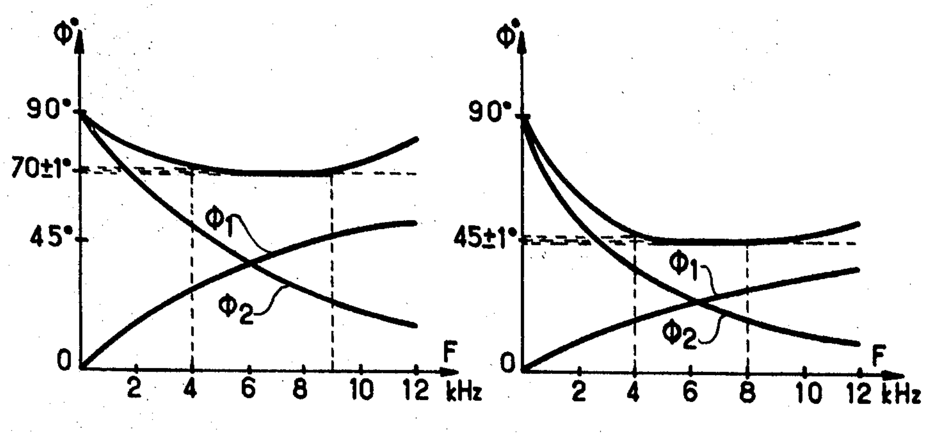

FIG. 5*a* shows by way of example the result obtained for $\Phi=70°$ in a band of about one octave, with $\Phi_1=\Phi_2=+035°$ at 6 kHz.

The parameter values to achieve this in one example are such that:

$R_1R_3/R_1+R_3=10.7$ kΩ $C_1=1735$ pf., $R_2=10.7$ kΩ $C_2=3540$ pf.

An another example, FIG. 5*b* shows the result obtained for $\Phi = 45°$, with $\Phi_1 = \Phi_2 = 22.5°$ at 6 kHz. The parameter values to achieve this is one example are such that: $R_1R_3/R_1+R_3=10.7$ kΩ $C_1=1020$ pf., $R_2=10.7$ kΩ $C_2=5980$ pf.

It is seen that in the case of FIGS. 5*a* and 5*b* the phase shift is constant to within ±1° over a range of about one octave, whereas in the case of FIG. 4 an exact quadrature is obtained over several octaves.

What we claim is:

1. A quadripole network comprising a differential amplifier having an output terminal and two input terminals one of which is connected through a first capacitor directly to ground and connected through a first resistance to the output terminal, while the second input terminal is connected through a second resistance to ground and through a second capacitor to an alternating current source of relatively low internal impedance.

2. A network as claimed in claim 1, in which the first capacitor is shunted by a stabilizing resistance.

3. A network as claimed in claim 2, in which the ohmic value of the stabilizing resistance is equal to the product of the first and second resistances divided by their difference.

4. A network as claimed in claim 1, in which the ohmic value of the first resistance times the capacitance of the first capacitor is substantially equal to the ohmic value of the second resistance times the capacitance of the second capacitor.

5. A network as claimed in claim 1, in which to obtain a constant phase shift $\Phi$ in an operating frequency band covered by the quadripole network, the following relationship exists:

$$\arctan R_1C_1\omega = \arctan 1/R_2C_2\omega = \frac{\Phi}{2}$$

where $\omega$ is equal to $2\pi$ times the source frequency.